(12) United States Patent
Yeh et al.

(10) Patent No.: US 8,112,103 B2
(45) Date of Patent: Feb. 7, 2012

(54) METHODS AND SYSTEMS FOR MOBILE DEVICE MESSAGING

(76) Inventors: Kuang-Chao Eric Yeh, Taipei (TW); Lynn Lin, Taipei (TW); George Shih, Taipei (TW)

( * ) Notice: Subject to any disclaimer, the term of this patent is extended or adjusted under 35 U.S.C. 154(b) by 1134 days.

(21) Appl. No.: 10/759,642

(22) Filed: Jan. 16, 2004

(65) Prior Publication Data
US 2005/0164721 A1   Jul. 28, 2005

(51) Int. Cl.
*H04W 4/00* (2009.01)
(52) U.S. Cl. ...................................... 455/466; 455/412.1
(58) Field of Classification Search ............... 455/412.1, 455/466
See application file for complete search history.

(56) References Cited

U.S. PATENT DOCUMENTS

| | | | |
|---|---|---|---|
| 6,424,841 B1 * | 7/2002 | Gustafsson | 455/466 |
| 6,597,918 B1 | 7/2003 | Kim | |
| 7,020,685 B1 * | 3/2006 | Chen et al. | 709/204 |
| 2002/0087704 A1 * | 7/2002 | Chesnais et al. | 709/228 |
| 2003/0058815 A1 | 3/2003 | Shen et al. | |
| 2003/0095540 A1 | 5/2003 | Mulligan et al. | |
| 2004/0110516 A1 * | 6/2004 | Miralles et al. | 455/466 |
| 2004/0259531 A1 * | 12/2004 | Wood et al. | 455/412.1 |
| 2008/0278740 A1 * | 11/2008 | Bird et al. | 358/1.15 |

FOREIGN PATENT DOCUMENTS

| | | |
|---|---|---|
| CN | 1343055 A | 4/2002 |
| CN | 1444378 A | 9/2003 |
| EP | 1091607 | 11/2001 |
| EP | 1168766 | 1/2002 |
| EP | 1361763 | 12/2003 |
| IE | 20020003 A2 | 1/2003 |
| JP | 2001-188743 | 7/2001 |
| JP | 2001-508958 | 7/2001 |
| JP | 2001-325194 | 11/2001 |
| JP | 2001-525642 | 12/2001 |
| JP | 2003-115925 | 4/2003 |
| JP | 2003-198628 | 7/2003 |
| KR | 2001-0056233 | 7/2001 |
| RU | 2190309 | 8/2000 |
| WO | WO 0245344 | 6/2002 |
| WO | WO 03001819 | 3/2003 |

(Continued)

OTHER PUBLICATIONS

"Digital cellular telecommunications system (Phase 2+); Universal Mobile Telecommunications System *UMTS); Multimedia Messaging Service *MMS); Functional description; State 2 (3GPP TS 23.140 version 4.10.0 Release 4)" European Telecommunications Standards Institute (ETSI), ETSI TS 123 10 V4.10.0 (Jun. 2003), XP-002381874, Jun. 30, 2003, pp. 1-79.

(Continued)

*Primary Examiner* — Pierre-Louis Desir
(74) *Attorney, Agent, or Firm* — Merchant & Gould, P.C.

(57) ABSTRACT

Embodiments of the present invention relate to methods, systems, and computer-readable media for mobile device messaging. Mobile device messaging comprises collecting from an originating system information including content data to be sent to the mobile device. One or more short messages are generating for encapsulating the content data. The one or more short messages are formatted to be readable by a web service and the content data is formatted to be readable by the mobile device. The one or more short messages are sent to the web service for delivery to the mobile device.

23 Claims, 9 Drawing Sheets

FOREIGN PATENT DOCUMENTS

| WO | WO 03/096720 A1 | 11/2003 |
|----|------|------|
| WO | WO 99/65256 A2 | 11/2003 |
| WO | WO 2004/006596 | 1/2004 |

OTHER PUBLICATIONS

"System integration of WAP and SMS for home network system," by Wu, Chi-Hsiang; Jan, Rong-Hong, Computer Networks v 42 n 4 Jul. 15, 2003, p. 493-502.

"iSMS: An integration platform for short message service and IP networks," by Rao, H.C.-H.; Chang, D.-F.; Lin, Y.-B., IEEE Network v 15 n 2 Mar./Apr. 2001, p. 48-55.

"On-line service adaptation for mobile and fixed terminal devices," by Korva, Jr.; Plomp, Jr.; Maatta, P.; Metso, M., Mobile Data Management, Second International Conference, MDM 2001. Proceedings (Lecture Notes in Computer Science vol. 1987), p. 252-9.

"Wireless data: new choices and challenges," by Borthick, S., Business Communications Review, vo. 30, No. 12, p. 28-38. (Any missing pages are advertisements.).

"The Mobile Internet," by Emmerson, B., BYTE (International Edition) vo. 23, No. 5, p. IS40/15-19.

"OPC-SMS: a wireless gateway to OPC-based data sources," by V. Kapsalis; S. Koubias; G. Papadopoulos, Computer Standards & Interfaces 24 (2002) 437-451.

Chinese Notice of Allowance in Application No. 200510083716.3, mailed Jun. 3, 2011, 3 pgs.

Australian Examiner's first report on patent application No. 2005200193, mailed Dec. 17, 2009, 2 pgs.

Russian Second Office Action in Application 2005100866, mailed Feb. 26, 2009, 8 pgs.

European Search Report for application No. 05000834.1 2412, mailed on Jun. 7, 2006 (4 pages).

Official Communication from the European Patent Office, First Examination Report for European application No. 05000834.1 2412, mailed on Mar. 1, 2007 (3 pages).

Response to Official Communication from the European Patent Office First Examination Report for European application No. 05000834.1 2412, mailed on Sep. 11, 2007 (13 pages).

Official Communication from the European Patent Office, Second Examination Report for European application No. 05000834.1 2412, mailed on Jun. 9, 2011 (5 pages).

Notice of First Office Action from Chinese Patent Office for Chinese application No. 2005/0083716.3, mailed on Mar. 13, 2009 (35 pages).

Response to Notice of First Office Action from Chinese Patent Office for Chinese application No. 2005/0083716.3, mailed on Jul. 13, 2009 (18 pages).

Notice of the Second Office Action from Chinese Patent Office for Chinese application No. 2005/0083716.3, mailed on Mar. 25, 2011 (6 pages).

Response to the Second Office Action from the Chinese Patent Office for Chinese application No. 2005/0083716.3, mailed on Apr. 25, 2011 (7 pages).

Notice of Rejection from the Japanese Patent Office for Japanese application No. 2005-009690, mailed on Aug. 24, 2010 (4 pages).

Response to the Notice of Rejection from the Japanese Patent Office for Japanese application No. 2005-009690, mailed on Dec. 24, 2010 (9 pages).

Notice of Final Rejection from the Japanese Patent Office for Japanese application No. 2005-09690, mailed on Apr. 26, 2011 (3 pages).

Preliminary Rejection from the Korean Patent Office for Korean application No. 10-2005-4116, mailed on May 9, 2011, (4 pages).

Response to Examiner's First Report on Australian application No. 20052000193, mailed on Sep. 23, 2010 (8 pages).

Examiner's Report No. 2 on Australian application No. 2005200193, mailed on Jul. 2, 2010 (6 pages).

Notice of Acceptance for Australian application No. 2005200193, mailed on Oct. 15, 2010 (3 pages).

Response to Official Action from the Patent Office of the Russian Federation for Russian application No. 2005100866/09, mailed on May 26, 2009 (5 pages).

Response to Official Action from the Patent Office of the Russian Federation for Russian application No. 2005100866/09, mailed on Nov. 30, 2009 (15 pages).

Notice of Allowance from the Patent Office of the Russian Federation for Russian application No. 2005100866/09, mailed on Feb. 1, 2010 (7 pages).

Response of Office Action from the Mexican Patent Office for Mexican application No. 2005/000670, mailed on Sep. 14, 2009 (17 pages).

Response to Office Action from the Mexican Patent Office for Mexican application No. 2005/000670, mailed Apr. 2, 2010 (20 pages).

Notice of Allowance from the Mexican Patent Office for Mexican application No. 2005/000670, mailed on Apr. 21, 2010 (2 pages).

Grant of Patent from the South African Patent Office for South African application No. 2005/0376, mailed on Jul. 19, 2007 (1 page).

Office Action from the Malaysian Patent Office for Malaysian application No. PI20050159, mailed on Mar. 31, 2010 (3 pages).

Response to Office Action from the Malaysian Patent Office for Malaysian application No. PI20050159, mailed on Jun. 30, 2010 (3 pages).

Search Report for Taiwan Invention Patent Application No. 094101240, Date of Research: Aug. 11, 2011, Received by Merchant & Gould, P.C. on Oct. 21, 2011, 1 page.

Japanese Notice of Allowance in Application 2005009690, mailed Nov. 22, 2011, 6 pgs.

Korean Final Notice of Preliminary Rejection in Application 10-2005-4116, mailed Nov. 11, 2011, 4 pgs. (in foreign language).

\* cited by examiner

METHODS AND SYSTEMS FOR MOBILE DEVICE MESSAGING

TECHNICAL FIELD

The present invention relates generally to the field of mobile computing devices and more particularly to sending messages to a mobile device through a web service.

BACKGROUND OF THE INVENTION

A wide variety of mobile computing devices such as cellular telephones, pagers, Personal Digital Assistants (PDAs), and others are commonly in use. Such devices may be connected with a wireless network such as a cellular network through which the mobile devices may connect with other computing devices and other mobile devices. For example, one mobile device may send a voice or text message over a wireless network to another wireless device.

Additionally, fixed networks such as the Internet and other types of Wide Area Networks (WANs) and Local Area Networks (LANs) continue to develop. Attempts have been made to bridge wireless networks to fixed networks in limited ways. For example, some wireless devices include browser software for surfing or browsing the Internet. Additionally, email and text messages may be sent from fixed networks to various wireless devices.

In some cases, a message, such as an email or other text message, may be sent to a mobile device in the form of a Hypertext Mark-up Language (HTML) file using the Hyper Text Transfer Protocol (HTTP). For example, a user of a mobile device or other computing device may send an email to a user of a mobile device in the form of HTML text via a server with which the mobile device is connected. The server may then forward the message to the mobile device.

In other cases, an application may send information to a mobile device by sending an email to the mobile device using normal email protocols. For example, a user of an application on a mobile device or other computing device, while executing an application, may initiate the sending of an email including some content information. The email is generated by the application or another email program and is then sent to a server connected with the initiating device using standard email protocols. The mail server then forwards the email message to the intended recipient.

However, both of these approaches present some problems and limitations. First of all, transferring HTML messages to mobile devices is not widely supported, either by mobile devices or by application programs which may originate such messages. For example, a personal organizer program such as Microsoft Outlook® may not support the generation of HTML text to transfer a calendar appointment or task reminder to a mobile device. Additionally, an HTML file for transferring such information is highly platform or application specific. Therefore, this method presents compatibility problems between various systems and applications. Further, various security features, such as corporate firewalls, proxy servers, etc., limit the types of messages that may be transferred out of or through a given fixed network. Therefore, the sending of an HTML or email message to an unknown or unrecognized device will be blocked. This limits or complicates the use of these methods with some fixed networks. It is with respect to these considerations and others that the present invention has been made.

SUMMARY OF THE INVENTION

In accordance with the present invention, the above and other problems are solved by methods and systems for mobile device messaging. These methods and systems include a web service client that converts content to be sent to a mobile device to a form readable by a web service. The client generates and sends one ore more short messages to the web service containing the converted content data. The web service receives the short messages, processes the messages, and converts the content data to a form that is readable by the intended mobile device. The web service then forwards the content data to a wireless network operator for delivery to the mobile device.

In accordance with other aspects of the present invention, a method of mobile device messaging comprises collecting information from an originating system that includes content data to be sent to the mobile device. One or more short messages are then generated for encapsulating the content data. The one or more short messages are formatted to be readable by a web service and the content data is formatted to be readable by the wireless device. Next, the one or more short messages are sent to the web service for delivery to the mobile device.

According to other aspects of the present invention, a system for mobile device messaging comprises a processor and a memory coupled with, and readable by, the processor. The memory contains instructions that, when executed by the processor, cause the processor to collect from an originating system information including content data to be sent to the mobile device. One or more short messages are generated for encapsulating the content data. The one or more short messages are formatted to be readable by a web service and the content data is formatted to be readable by the wireless device. The one or more short messages are sent to a web service for delivery to the mobile device.

According to yet another aspect of the present invention, a system for mobile device messaging comprises a processor and a memory coupled with and readable by the processor. The memory contains a series of instructions that, when executed by the processor, cause the processor to receive a short message from a web service client. The short messaging is formatted to be readable by a web service and contains content data formatted to be readable by a mobile device. A determination is made as to whether a sender of the short message is authentic and authorized to send the short message. If the sender of the short message is authentic and authorized to send the short message, the content data is sent to the mobile device.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Before describing various embodiments of the present invention, some terms that will be used throughout this description will be defined.

"Mobile messaging" refers to sending and/or receiving data, such as text messages, email, reminders, calendar appointments, video, audio, graphics, and other types of data, to or from a mobile device over a wireless network.

A "Multimedia Message Service (MMS)" is a service for sending and receiving graphics, video, sounds and other multimedia content over a network that is widely supported by various mobile devices.

A "Multimedia Message Service Center (MMSC)" is a system typically operated by a wireless network operator for receiving MMS messages and directing the messages to an intended recipient.

A "short message" is a message of a limited size and pre-defined format readable by a web service and used to encapsulate data transferred to or from a mobile device.

A "Short Message Service (SMS)" is a service for sending and receiving short text messages over a network that is widely supported by various mobile devices.

A "Short Message Service Center (SMSC)" is a system typically operated by a wireless network operator for receiving SMS messages and directing the messages to an intended recipient.

"Simple Object Access Protocol (SOAP)" is a messaging protocol using eXtensible Markup Language (XML) to encode information in web service requests and responses.

A "web service" is a set of self-contained, modular applications or services stored on a server and made available for access across the Internet. A web service provides the functionality of the various applications stored thereon to a client application without requiring the client application to provide that functionality. To use the services, the client invokes the service and/or passes data to the web service in a form readable by that service.

Figure 1:
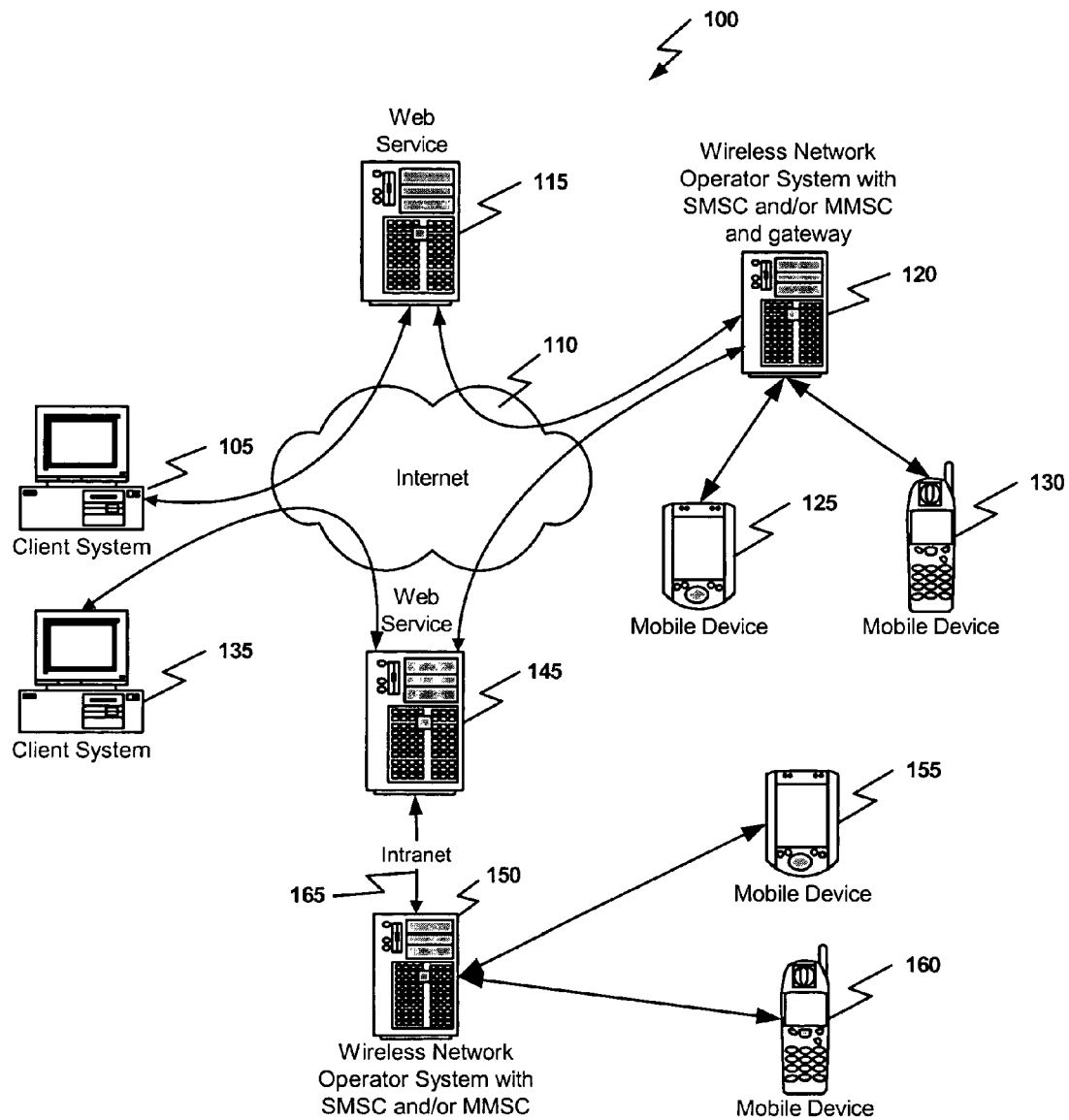
FIG. 1 illustrates an environment that includes a system for sending messages to a mobile device according to an embodiment of the present invention.

FIG. 1 illustrates a system for sending messages to a mobile device according to an embodiment of the present invention. The system 100 includes two web services 115 and 145, two client systems 105 and 135, two wireless network operator systems 120 and 150 including a Short Message Service Center (SMSC) and/or a Multimedia Message Service Center (MMSC), and a number of mobile devices 125, 130, 155, and 160. In actual implementation, any number of web services, client systems, wireless network operator systems, and mobile devices may be used.

The client systems 105 and 135 may be connected with one or more of the web services 115 and 145 via the Internet 110 or other network. The provider of a web service 115 may be either integrated with or separate from the wireless network operator. When separate, the web service 115 may connect with the wireless network operator system 120 via the Internet 110 or other network. Alternatively, the provider of a web service 145 may be the same entity that provides the wireless service and therefore also maintains the wireless network operator system 150. In this case, the web service 145 may be connected with the wireless network operator system 150 via an Intranet 165 or other type of network. As will be seen, the web services 115 and 145 provide a set of modular applications for transferring content from the client systems 105 and/or 135 to one or more of the mobile devices 125, 130, 155, and/or 160 through a pre-defined interface. In this way, to send a message to a mobile device, the client system can present the content data to the web service without a need to perform additional functions associated with this transfer.

A user of the client system 105 or 135 may initiate the sending of a message to one or more of the mobile devices 125, 130, 155, and 160. For example, the user of a client system 105 or 135, while viewing an email message, may choose to forward that message to a mobile device 125, 130, 155, and/or 160. The client system 105 or 135 then generates one or more short messages to encapsulate the content of the email being forwarded. That is, the client system generates a message that is readable by the web service 115 or 145. The short message may include the content data in the form of a Short Message Service (SMS) message or a Multimedia Message Service (MMS) message or similar format that will be readable by the mobile device to which the content is being sent. The short message encapsulating the content follows a schema or format similar to that described below with reference to FIG. 4. Once the short messages are generated, the client system 105 or 135 sends the short messages to the web service 115 or 145 via a channel established with the web service 115 or 145 over the Internet 110. In one example, the short message may be conveniently sent to the web service 115 or 145 using the widely supported Simple Object Access Protocol (SOAP).

The web service 115 or 145, as will be described in detail below, parses the short message, checks the authenticity and authority of the user of the client system 105 or 135 to send the short message, and if the user is authenticated and authorized, sends the content of the short message to the wireless network operator system 120 or 150. Additionally, the web service 115 or 145 may perform other functions such as checking the short message for errors, logging the message and results of sending the message, etc. In some cases, the web service 115 or 145 may even modify the format of the content contained in the short message to place it into a format readable by a specific mobile device.

In the case where the web service 115 and wireless network operator system 120 are operated by separate entities, the wireless operator system 120 includes an SMSC gateway (not shown) and/or MMSC gateway (not shown) for receiving and handling the short message sent by the web service 115 and forwarding the message to the SMSC and/or MMSC. If, however the web service 145 and wireless operator system 150 are maintained by the same entity, the web service may pass the short message directly to the SMSC and/or MMSC and the wireless network operator system 150.

The successfully processed short message will be put in the queue of the SMSC or MMSC by the wireless network operator system 120 or 150 which then sends a response to the web service 115 or 145 informing the web service 115 or 145 of the status of the message delivery. That is, the wireless network operator system 120 or 150 informs the web service 115 or 145 of whether the message was successfully delivered to the SMSC or MMSC queue or, if not successfully delivered, may return error information. The wireless network operator system 120 or 150 then sends the message to the mobile device designated to be the recipient.

The web service 115 or 145 then, based on the response from the wireless network operator system 120 or 150, generates a response to the short message from the client system 105 or 135 and sends the response to the client. That is, the web service 115 or 145 will generate a response message based on the response from the wireless network operator 120 or 150. The format of the response message will be discussed in detail below but generally may include an indication of success or failure of delivery of the message, return codes, error codes, or other information. The web service 115 or 145 then sends the response to the client system 105 or 135 which may in turn inform the user of the response.

Figure 2:
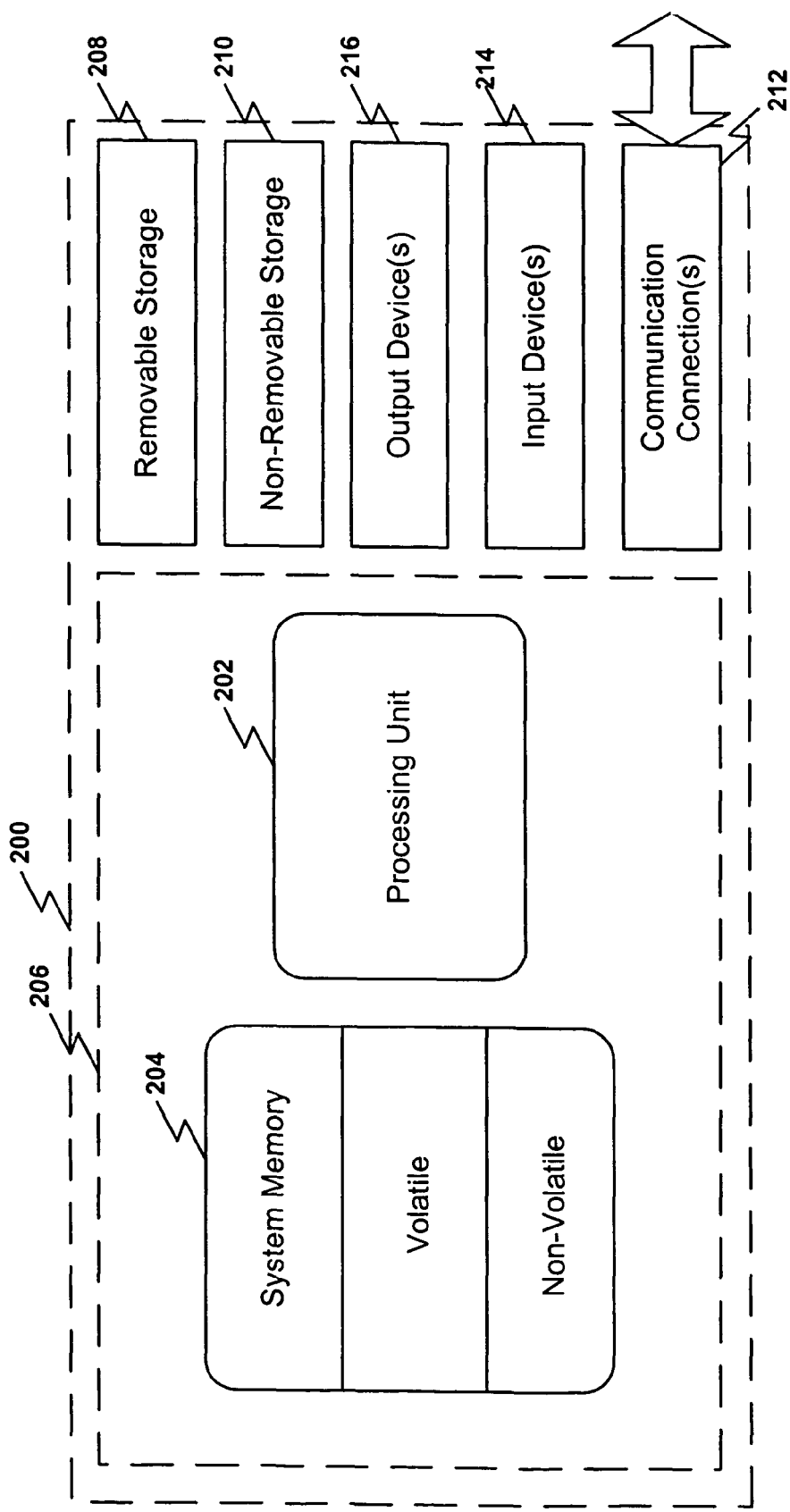
FIG. 2 illustrates an example of a suitable computing system environment on which embodiments of the invention may be implemented.

FIG. 2 illustrates an example of a suitable computing system environment on which embodiments of the invention may be implemented. This system 200 is representative of one that may be used to serve as a client system or a server providing the web service. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 typically includes communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

A computing device, such as system 200, typically includes at least some form of computer-readable media. Computer readable media can be any available media that can be accessed by the system 200. By way of example, and not limitation, computer-readable media might comprise computer storage media and communication media.

Figure 3:
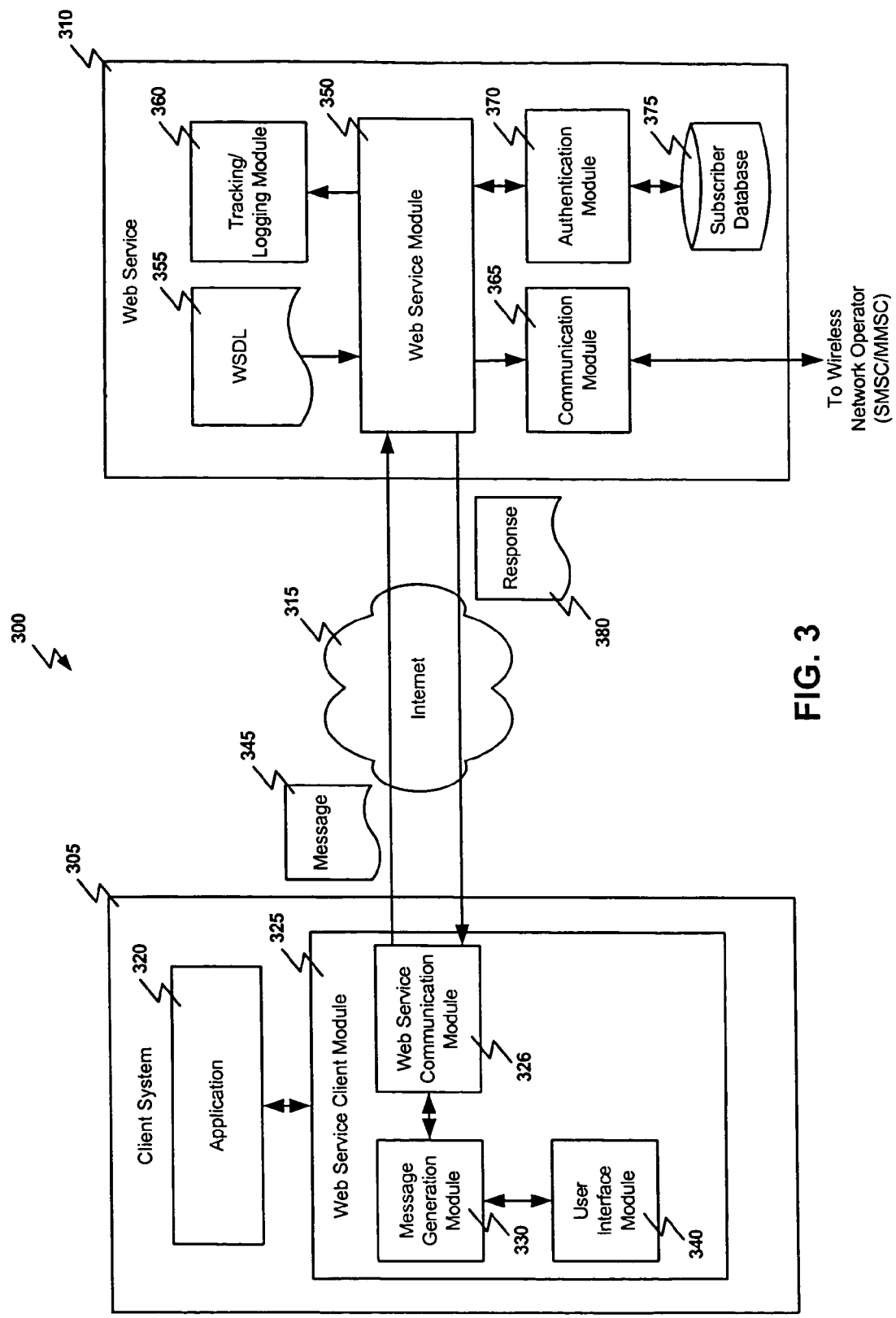
FIG. 3 illustrates functional components of a system for sending messages to a mobile device according to an embodiment of the present invention.

FIG. 3 illustrates functional components of a system for sending messages to a mobile device according to an embodiment of the present invention. This example includes a client system 305 connected with a web service 310 via the Internet 315 or other network. Alternatively, client system 305 may be a mobile device initiating a message to another mobile device. In such a case, the components and operations will be the same as discussed below with reference to the client system 305.

The client system 305 includes messaging application 320 such as Microsoft Outlook® or other application program and a web service client 325. During execution, the application 320 may initiate sending of a message to a mobile device such as through a user selecting a user interface element. For example, a user of Microsoft Outlook® may wish to send a calendar appointment to his co-worker's PDA or cell phone on a separate platform or that uses a separate message application. In such a case, the user may select a user interface element indicating an option to send a message to a mobile device. In response, the application 320 then invokes, instantiates, or otherwise triggers the web service client module 325.

The web service client 325 includes a user interface module 340, a message generation module 330, and a web service communication module 326. The user interface module 340 queries the user for specific information to be included in the message. For example, the user interface module 340 prompts the user for destination information such as the destination device's service provider, phone number and/or other identifying information. Additionally, the user interface module 340 may query the user for information such as a user identification and/or password to be used by the web service 310 for authentication and/or authorization of the message as will be discussed below. In alternative embodiments, the user information may be preset and retrieved as needed to allow for a more automatic process of message generation.

Generally speaking, the content to be sent to the destination mobile device is placed into a form that is readable by the destination mobile device. For example, since SMS and MMS are widely supported by most mobile devices, these formats are convenient for transferring the content data. Additionally, since a message such as an SMS message or MMS message has a pre-defined size limit, the content is checked against this limit. If the size of the content exceeds the size limit for the content, the message generation module 330 divides the content into a number of segments to be encapsulated in more than one short message. This division or split may be made by default. In other cases, the user may be queried to determine whether the user agrees to allow the division of data into multiple messages.

The message generation module 330 then generates a short message readable by the web service to encapsulate the content to be sent to the destination mobile device. For example, an XML message may be generated following a pre-defined schema. Details of such a short message and an exemplary schema will be discussed below with reference to FIG. 4. Alternatively, another format or schema, readable by the web service may be used.

Once the short message is generated the web service communication module 326 sends the short message 345 to the web service 310 via a channel established over the Internet 315. In one example, the short message may be conveniently sent to the web service 310 using the widely supported Simple Object Access Protocol (SOAP).

The web service 310 includes a Web Service Description Language (WSDL) file 335 defining a web service module 350. That is, the WSDL file 335 may include an XML or other description of the services provided by the web service module 350. An exemplary WSDL file is listed below in Table 1.

TABLE 1

```
<?xml version="1.0" encoding="utf-8"?>
<definitions xmlns:http="http://schemas.xmlsoap.org/wsdl/http/"
xmlns:soap="http://schemas.xmlsoap.org/wsdl/soap/" xmlns:s="http://www.w3.org/2001/XMLSchema"
xmlns:s0="urn:Microsoft.Office.OMMS.OMMWS" xmlns:soapenc="http://schemas.xmlsoap.org/soap/encoding/"
xmlns:tm="http://microsoft.com/wsdl/mime/textMatching/" xmlns:mime="http://schemas.xmlsoap.org/wsdl/mime/"
targetNamespace="urn:Microsoft.Office.OMMS.OMMWS" xmlns="http://schemas.xmlsoap.org/wsdl/">
    <types>
        <s:schema elementFormDefault="qualified" targetNamespace="urn:Microsoft.Office.OMMS.OMMWS">
            <s:element name="sendXml">
                <s:complexType>
                    <s:sequence>
                        <s:element minOccurs="0" maxOccurs="1" name="SMSData" type="s:string" />
                    </s:sequence>
                </s:complexType>
            </s:element>
            <s:element name="sendXmlResponse">
                <s:complexType>
                    <s:sequence>
                        <s:element minOccurs="0" maxOccurs="1" name="sendXmlResult" type="s:string" />
                    </s:sequence>
                </s:complexType>
            </s:element>
        </s:schema>
    </types>
    <message name="sendXmlSoapIn">
        <part name="parameters" element="s0:sendXml" />
    </message>
    <message name="sendXmlSoapOut">
        <part name="parameters" element="s0:sendXmlResponse" />
    </message>
    <portType name="OMMWebServiceSoap">
        <operation name="sendXml">
            <documentation>This method handles the request from Microsoft Office Mobile Message Add-in.</documentation>
            <input message="s0:sendXmlSoapIn" />
            <output message="s0:sendXmlSoapOut" />
        </operation>
    </portType>
    <binding name="OMMWebServiceSoap" type="s0:OMMWebServiceSoap">
        <soap:binding transport="http://schemas.xmlsoap.org/soap/http" style="document" />
        <operation name="sendXml">
            <soap:operation soapAction="urn:Microsoft.Office.OMMS.OMMWS/sendXml" style="document" />
            <input>
                <soap:body use="literal" />
            </input>
            <output>
                <soap:body use="literal" />
            </output>
        </operation>
    </binding>
    <service name="OMMWebService">
        <documentation>Microsoft Office Mobile Message Web Service.</documentation>
        <port name="OMMWebServiceSoap" binding="s0:OMMWebServiceSoap">
            <soap:address location="http://localhost/OMMWS/OMMWebService.asmx" />
        </port>
    </service>
</definitions>
```

The web service module 350 receives the short message 345 from the client system 305. The web service module 350 then parses the short message and passes the sender's identification information to the authentication module 370. The authentication module 370 determines whether the user of the client system 305 is who he claims to be and is authorized to send the message. This determination may be made by comparing the sender's information such as an identification and password against information in the subscriber database 375. If the provider of the web service 310 is different from the provider of the wireless service, the subscriber database 375 may be maintained by the wireless service provider rather than the provider of the web service 310. In such a case, the authentication module 370 may request the subscriber information from the SMSC or MMSC of the wireless network operator.

If the user of the client system 305 is authentic and authorized, the web service module 350 passes the content of the short message to the communication module 365. The communication module 365 then sends the message to the SMSC of the wireless network operator. As discussed above, the wireless network operator sends back a response indicating success or failure of delivery of the message. The communication module 365 receives this response and passes it along to the web service module 350. The web service module 350 in turn generates a response to the short message 345 from the client system 305 based on the response from the wireless network operator system. That is, the web service module 350 generates a response based on the response from the wireless network operator. The format of the response will be discussed in detail below with reference to FIG. 5 but generally may include an indication of success or failure of delivery of the message, return codes, error codes, or other information. The web service module 350 then sends the response 380 to the client system 305 via the Internet 315. Additionally, tracking/logging module 360 may record information related to the short message 345 and the response 380 such as the sender's identification, time, results, error codes, etc.

The web service communication module 325 of the client system 305 receives the response 380 and may parse the response and pass the results to the user interface module 340. The user interface module 340 may then inform the user of the client system 305 of the success or failure of the message. For example, the user interface module may open a window or other user interface element to display a message indicating success or failure of the message. A message indicating failure may also indicate error codes or messages.

Figure 4:
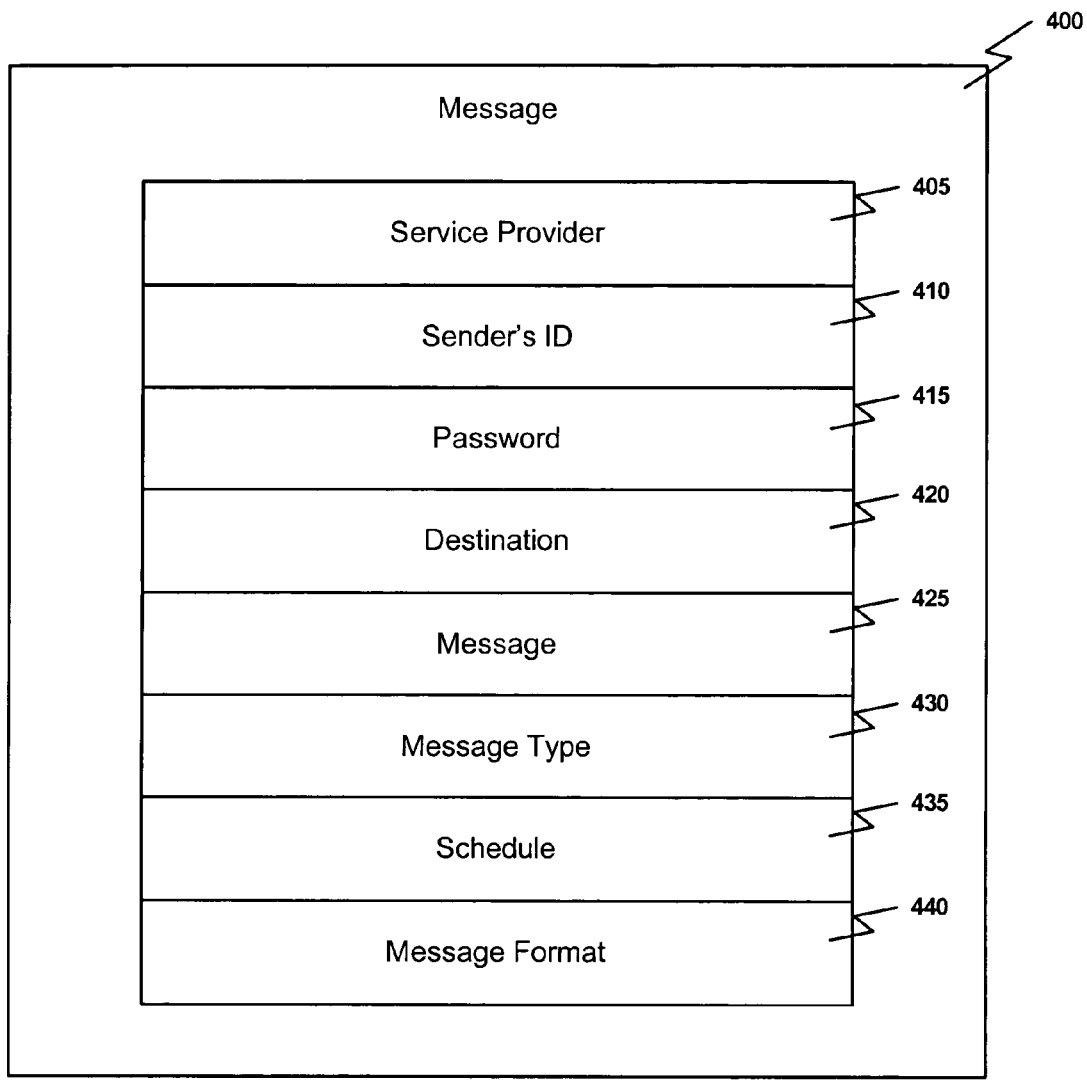
FIG. 4 illustrates an exemplary data format for a short message from a client system or mobile device to a web service according to an embodiment of the present invention.

FIG. 4 illustrates an exemplary format for a message from a client system or mobile device to a web service according to an embodiment of the present invention. This example illustrates one possible format for a short message. However, depending upon the exact implementation, the format may vary. For example, additional elements may be included, the elements may be in a different order or some illustrated elements may be omitted. This message format may be defined as an XML schema or in another similar manner. Table 2 is an exemplary XML schema for defining a message format as illustrated in FIG. 4.

TABLE 2

```
<?xml version="1.0" encoding="utf-8" ?>
<xs:schema targetNamespace="urn:Microsoft.Office.OMMS.SMSData" elementFormDefault="qualified"
xmlns="urn:Microsoft.Office.OMMS.SMSData" xmlns:mstns="urn:Microsoft.Office.OMMS.SMSData"
xmlns:xs="http://www.w3.org/2001/XMLSchema">
    <xs:element name="SMSData">
        <xs:complexType>
            <xs:sequence>
                <xs:element name="Carrier" type="xs:string" minOccurs="1" maxOccurs="1" />
                <xs:element name="Id" type="xs:string" maxOccurs="1" minOccurs="1" />
                <xs:element name="Password" type="xs:string" maxOccurs="1" minOccurs="1" />
                <xs:element name="ToMobile" type="xs:string" maxOccurs="1" minOccurs="1" />
                <xs:element name="Message" type="xs:string" minOccurs="1" maxOccurs="unbounded" />
                <xs:element name="MsgType" type="xs:string" minOccurs="1" maxOccurs="1" />
                <xs:element name="Scheduled" type="xs:time" minOccurs="0" maxOccurs="1" />
                <xs:element name="MMS" minOccurs="0" maxOccurs="1">
                    <xs:complexType>
                        <xs:simpleContent>
                            <xs:extension base="xs:boolean">
                                <xs:attribute name="format" type="xs:string" default="text" use="optional" />
                            </xs:extension>
                        </xs:simpleContent>
                    </xs:complexType>
                </xs:element>
            </xs:sequence>
        </xs:complexType>
    </xs:element>
</xs:schema>
```

The message format illustrated in FIG. 4 includes a service provider element 405, a sender's ID element 410, a password element 415, a destination element 420, a message field 425, a message type element 430, a schedule element 435, and a message format element 440.

The service provider element 405, identified by the name "Carrier" in Table 2, indicates the service provider that sets up the web service. Depending on whether the service provider is also a wireless service carrier, it may communicate with an SMSC or MMSC or gateway of a cooperative carrier of the wireless service as discussed above with reference to FIG. 1.

The sender's ID element 410 indicates the user name or other identifying information about the sender of the message. The sender's ID element 410 is identified by the name "Id" in Table 2. This information may be used by both the web service and the destination mobile device to identify the origin of the message. For example, the sender's ID element 410 may be used by the web service to track or log messages or to determine whether the sender is authorized to send the message.

The password element 415, identified by the name "Password" in Table 2, indicates a password for the sender. This password may be used, for example, by the web service to identify and authenticate the sender of the message.

The destination element 420 indicates the phone number, address or other identification of the destination mobile device. The destination element 420 is identified by the name "ToMobile" in Table 2. This information is passed from the web service to the wireless network service operator for delivery of the message to the mobile device.

The message element 425, identified by the name "Message" in Table 2, contains the content of the message. For example, the message element 425 may contain the text of an email, a calendar appointment, a task reminder, or other type of content. In some cases, where the content being sent exceeds the predetermined size of the small message, the message element 425 may contain a portion of a larger content as discussed above.

The message type element 430 indicates the type of content being delivered. For example, the message type element 430 may indicate that the data in the message element 425 is an email message or a calendar appointment. The message type element 430 is identified by the name "MsgType" in Table 2.

The schedule element 435 may indicate a specific time for delivery of the message to the destination mobile device. The schedule element 435 is identified by the "Scheduled" name in Table 2. This information may indicate, for example, a time and date at which the web service should deliver the message to the wireless network service operator for delivery to the destination mobile device.

The message format element 440, indicated by the "MMS" name in Table 2, indicates the type of message contained in the message element 425. For example, the message format element 440 may indicate whether the message element 425 is an SMS message or an MMS message.

Figure 5:
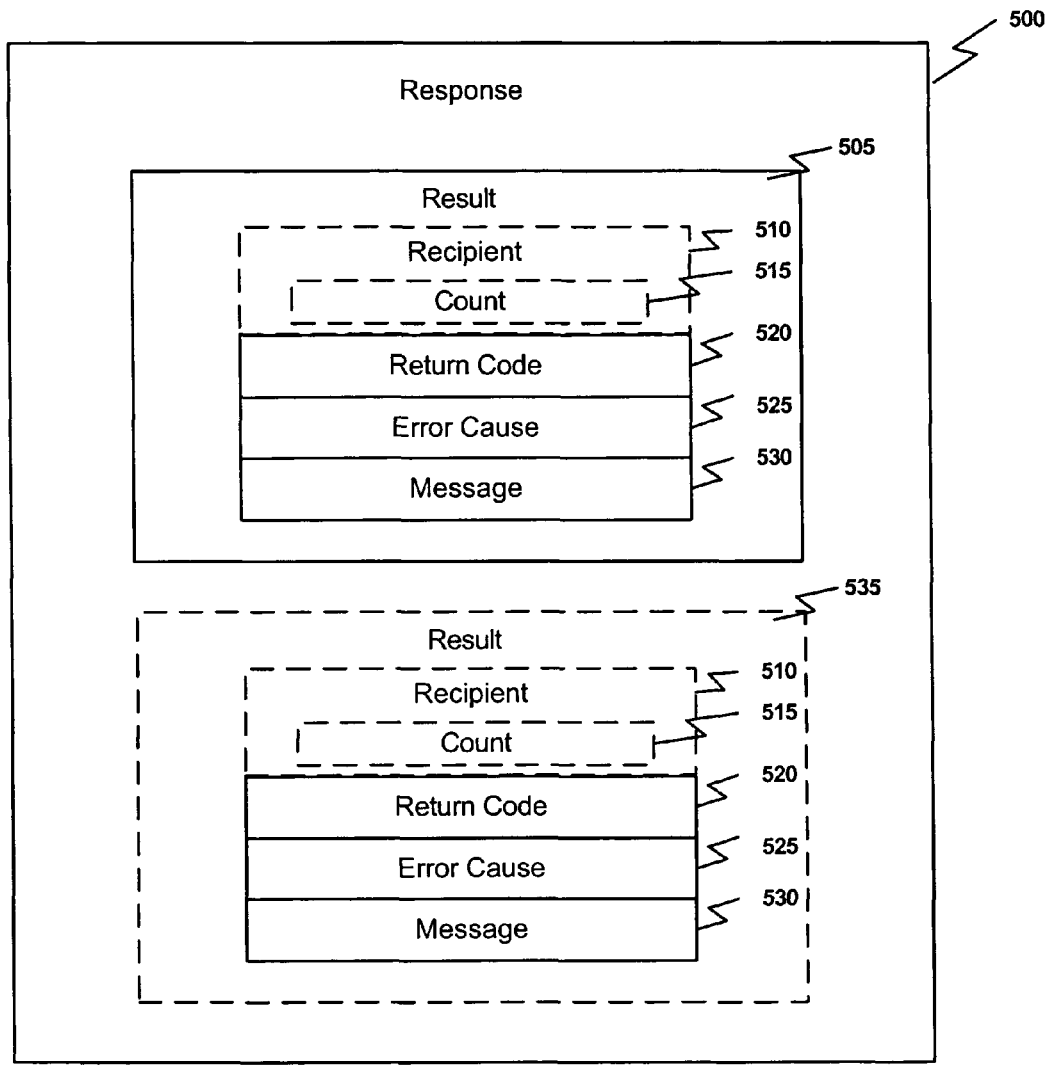
FIG. 5 illustrates an exemplary data format for a response from a web service to a client system or mobile device according to an embodiment of the present invention.

FIG. 5 illustrates an exemplary format for a response from a web service to a client system or mobile device according to an embodiment of the present invention. This example illustrates one possible format for a response to a short message. However, depending upon the exact implementation, the format may vary. For example, additional elements may be included, the elements may be in a different order or some illustrated elements may be omitted. This response format may be defined as an XML schema or in another similar manner. Table 3 is an exemplary XML schema for defining a response format as illustrated in FIG. 5.

The result element 505 or 535, identified by the name "Result" in Table 3, indicates a set of processing results having the same return code. That is, the result element 505 indicates the wireless network service operator's results of sending the message to the destination device. Additionally, the result element 505 may indicate results of checks performed by the web service such as authenticity and authorization checks for the message. Multiple result elements may be used in the case of multiple or split messages. For example, if two short messages were sent, one resulting in errors, two result elements may be included in the response. In this case, one result element may indicate the successful result while the other result element indicates the error result.

The optional recipient element 510 indicates the cell phone number, address, or other identifying information for the destination mobile device. The recipient element 510 is identified by the "ToMobile" name in Table 3. The recipient element 510 may be omitted generally indicating there is an error and the error has nothing to do with the recipient. For example, if the sender gives an invalid password, the resulting error has nothing to do with the recipient. Therefore, the recipient element 510 may be omitted from the response 500 since it is not relevant to that error.

The optional count element 515 that is a child of recipient element 510, identified by the "Count" name in Table 3, indicates the number of messages to which the recipient element 505 corresponds in the event of split or multiple messages. For example, the count element may indicate three meaning that three messages where delivered with the results indicated by the result element 505. To further illustrate, consider an example where a client system sends a group of

TABLE 3

```
<?xml version="1.0" encoding="utf-8" ?>
<xs:schema targetNamespace="urn:Microsoft.Office.OMMS.Response" elementFormDefault="qualified"
xmlns="urn:Microsoft.Office.OMMS.Response" xmlns:mstns="urn:Microsoft.Office.OMMS.Response"
xmlns:xs="http://www.w3.org/2001/XMLSchema" id="Response">
   <xs:element name="Response">
      <xs:complexType>
         <xs:sequence>
            <xs:element name="Result" minOccurs="1" maxOccurs="unbounded">
               <xs:complexType>
                  <xs:sequence>
                     <xs:element name="ToMobile" minOccurs="0" maxOccurs="1">
                        <xs:complexType mixed="true">
                           <xs:sequence>
                              <xs:element name="Count" type="xs:string" minOccurs="0"
maxOccurs="1" />
                           </xs:sequence>
                        </xs:complexType>
                     </xs:element>
                     <xs:element name="RetCode" type="xs:string" maxOccurs="1" minOccurs="1" />
                     <xs:element name="ErrCause" type="xs:string" maxOccurs="1" minOccurs="1" />
                     <xs:element name="Message" type="xs:string" maxOccurs="1" minOccurs="1" />
                  </xs:sequence>
               </xs:complexType>
            </xs:element>
         </xs:sequence>
      </xs:complexType>
   </xs:element>
</xs:schema>
```

The response format illustrated in FIG. 5 includes one or more result elements 505 and 535. Each result element may include a number of child elements representing details of the sending result. In this example, the result element 505 and 535 includes an optional recipient element 510, an optional count element 515 that is a child of the recipient element 510 if present, a return code element 520, an error cause element 525, and a message element 530.

five messages to one mobile device. If three messages are successfully delivered and two messages fail because the messages were not authorized, two results will be returned. One result will indicate a successful result with a count of 3 and the other result will indicate an unsuccessful result with a count of 2.

The return code element 520 may contain a numeric value or other code indicating the result of the web service's handling of the message to which the response corresponds. For example, the return code element 520 may indicate web service errors, SMSC errors, authentication errors and others. The return code element 520 is identified by the "RetCode" name in Table 3.

The error cause element 525, identified by the "ErrCause" name in Table 3, may contain an indication of the component that is the cause of an error. For example, if the user's password in the original short message was invalid, the error cause element 525 can indicate the Client as the cause of the error. In another example, if the SMSC of the service provider returns a response to the web service indicating failure of the delivery of the message, the error cause element 525 may indicate the SMSC as the cause.

The message element 530, identified by the "Message" name in Table 3, may contain a message describing the error. For example, the message element 530 may contain text or other easily readable information describing the nature of or reason for the error. This message may be displayed to the user of the client system or initiating mobile device to inform the user of the nature of the error.

More than one set of result elements in a response generally indicates that there is more than one group of results having the same return code. Each successive result element follows the same format such as the exemplary format described above. To further illustrate, consider an example where a client system sends the same message to three mobile devices at the same time. If two messages are successfully delivered to each of the first two recipients and one message fails because the recipient's phone number is incorrect, two results will be returned. One result will indicate a successful result with a success return code and the other result will indicate an unsuccessful result with invalid recipient number return code.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 6:
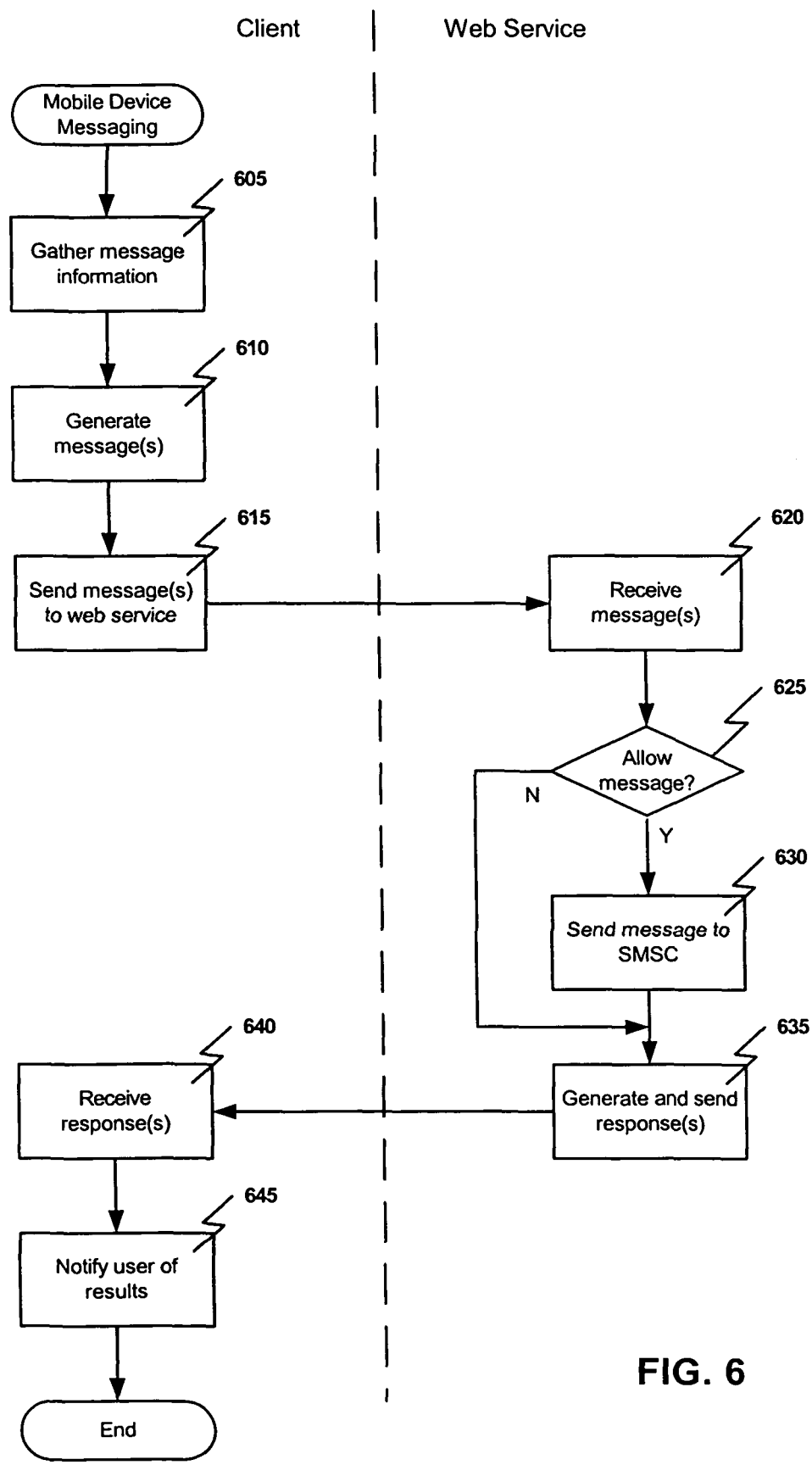
FIG. 6 is a flowchart illustrating, at a high level, sending a message to a mobile device according to an embodiment of the present invention.

FIG. 6 is a flowchart illustrating sending a message to a mobile device according to an embodiment of the present invention. This example refers to a client system initiating sending of the message to a mobile device where the client system may be a mobile device or not.

In this example, operation begins with gather operation 605 being performed by the client system. Gather operation 605 gathers the information to be included in the short message. For example, a window or other user interface element may be opened to query the user for the destination mobile device's wireless service carrier, and number or address as well as the user's name or other identification and password. Additionally, the message type, delivery schedule, and message content may also be collected.

Next, generate operation 610 generates one or more short messages for encapsulating the content to be sent to the destination mobile device. For example, an XML file following the schema listed in Table 2 may be generated. As discussed above, if the content to be sent to the destination mobile device is longer than the predefined small message size, the content may be divided into smaller portions. In such a case, a small message for each portion will be generated.

Once one or more short messages have been generated, send operation 615 sends the short messages from the client system to the web service. This sending may be performed using Simple Object Access Protocol (SOAP) over a channel established between the client system and the web service over the Internet or other network.

Receive operation 620 performed by the web service then receives the short messages from the client system. Then, query operation 625 determines whether to allow the messages. This determination may be based on a number of factors. For example, a first factor may be whether the user of the client system has provided a valid identification and password. Another factor may be whether the user of the client system is authorized to send messages based on having a current, paid account with the web service. Additionally, tests may be performed on the short message to determine whether it is well-formed and meets other possible requirements.

If a determination is made at query operation 625 that the message should be allowed, send operation 630, at the scheduled time or immediately if no scheduled time is indicated, sends the short message to the SMSC of the destination mobile device's service provider for delivery to the mobile device. Generate operation 635 then generates response such as an XML file following the schema listed in Table 3 above indicating success or failure of the message along with appropriate return codes, error codes, and error messages and sends the response to the client system.

If a determination is made at query operation 625 that the message should not be allowed, generate operation 635 generates a response such as an XML file following the schema listed in Table 3 above indicating failure of the message along with appropriate return codes, error codes, and error messages and sends the response to the client system.

Figure 7:
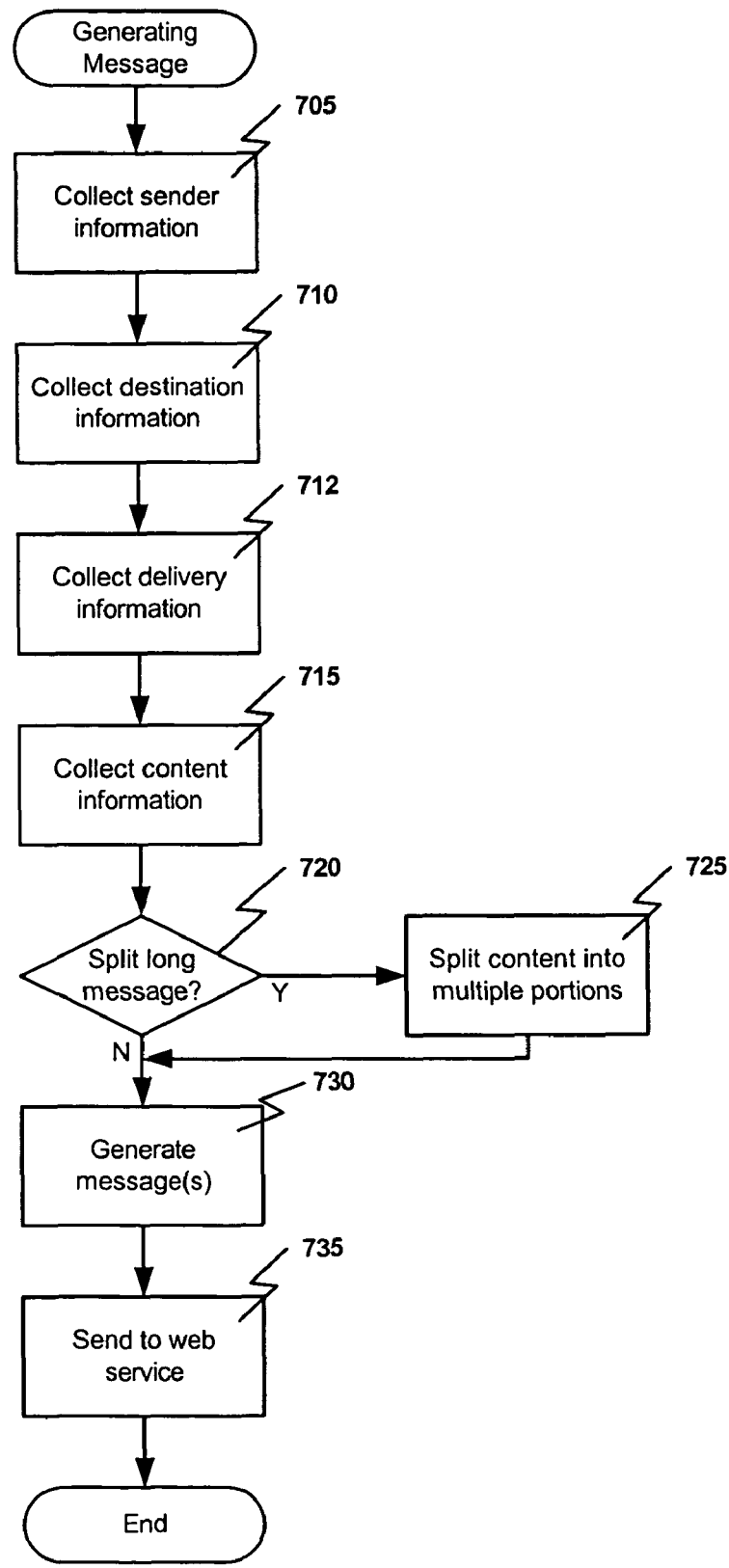
FIG. 7 is a flowchart illustrating generating and sending a message to a mobile device according to an embodiment of the present invention.

FIG. 7 is a flowchart illustrating generating and sending a short message to a mobile device according to an embodiment of the present invention. These operations may be initiated in multiple ways. First, generating and sending a short message may be initiated in an interactive mode wherein the user of the client system or initiating mobile device triggers the message through the user interface of the system or device. In another example, message generation and sending may be performed automatically upon the occurrence of some event or passage of some time or other condition. For example, a system may be configured to automatically forward all emails to a mobile device.

In the example illustrated in FIG. 7, operation begins with collect operation 705. Collect operation 705 collects sender information such as the sender's user name or other identification, a password, and other possible information specific to the sender. Collection of this data may be performed by querying the user, by reading saved information previously provided by the user, or in other ways.

Next, collect operation 710 collects destination information. That is, collect operation 710 may open a window or other user interface element and query the user for destination information such as a service provider for the destination mobile device, a cell number for the destination mobile device, and other possible identifying information.

Collection operation 712 collects information such as the delivery time for the message. For example, the user may want the message to be delivered as soon as possible or at some later time, specified time. Therefore, the user may specify a time and date for delivery. Additionally, other details of delivery may be collected by collection operation 712. For example, the user may indicate whether to allow splitting of data that is longer than the short message size into multiple short messages for delivery. As with other data, this information may be pre-configured and retrieved automatically or may be collected by querying the user.

Collection operation 715 then collects the content to be sent to the destination mobile device encapsulated in one or more short messages. For example, collection operation 715 may read an email message, calendar appointment, word processing file, spreadsheet, or other information. The information to be sent may be identified by the user or may be assumed by the context in which generation of the message was initiated, such as clicking on a button or other user interface element while viewing the data.

Query operation 720 then makes a determination as to whether the data to be sent should be included in one or more than one short message. For example, an SMS message has a pre-defined size limit. If the data is longer than this limit and a determination is made to split the message, the data is divided into more than one message. The determination to split the data may be based on delivery information collected in collection operation 712 described above. If, at query operation 720, a determination is made that the data length is longer than the small message size and a user has chosen to split it, split operation 725 will divide the content into multiple portions, each small enough to be contained in a small message.

Generate operation 730 then generates one or more small messages encapsulating the content data. That is, generate operation 730 generates one or more XML files following the schema listed in Table 2 and including the collected sender information, destination information, and content information.

Finally, send operation 735 sends the one or more small messages to the web service. As discussed above, the small message may be sent to the web service using SOAP over a channel established between the client system or initiating mobile device and the web service over the Internet or other network.

Figure 8:
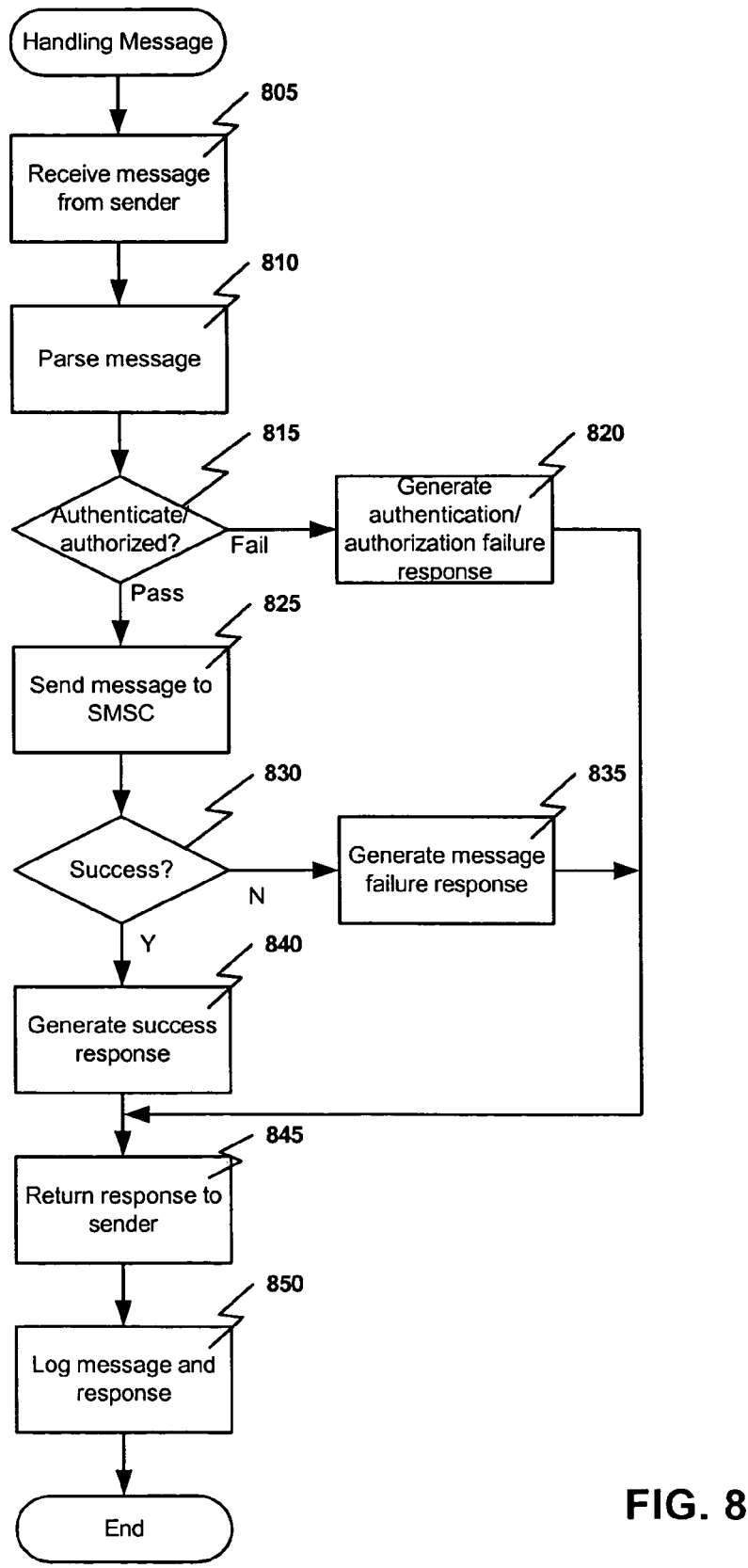
FIG. 8 is a flowchart illustrating handling a message to a mobile device according to an embodiment of the present invention.

FIG. 8 is a flowchart illustrating handling a short message to a mobile device according to an embodiment of the present invention. Here, operation begins with receive operation 805. Receive operation 805 receives the short message from the client system or initiating mobile device.

Parse operation 810 then parses the received message. That is, the received message is parsed, based on the delimiters of the XML file to identify and read the individual elements as described above with reference to FIG. 4.

Query operation 815 then determines whether the user initiating the message is authentic and authorized to send the message. These determinations may be made by comparing the sender's information such as an identification and password against information in the subscriber database. For example, the sender's identification and password may be checked against recorded information. Additionally, a check of authority to send the message may be based on whether the sender has a current, paid account with the service provider. If the sender fails authentication or authorization, generate operation 820 generates a response message with the appropriate response code, return code, error code, error message, etc. Return operation 845 then sends the response back to the sender and log operation 850 records the message and results.

If, at query operation 815, a determination is made that the sender is authentic and authorized, send operation 825 sends the short message to the SMSC of the wireless service provider as indicated in the short message.

Query operation 830 then checks the response from the SMSC to determine whether the message was successfully placed in the transmission queue of the SMSC. If the message was not successfully queued, generate operation 835 generates a response message with the appropriate response code, return code, error code, error message, etc. Return operation 845 then sends the response back to the sender and log operation 850 records the message and results.

If, at query operation 830 determines that the message was successfully queued, generate operation 840 generates a response message with the appropriate response code, return code, error code, error message, etc. Return operation 845 then sends the response back to the sender and log operation 850 records the message and results.

Figure 9:
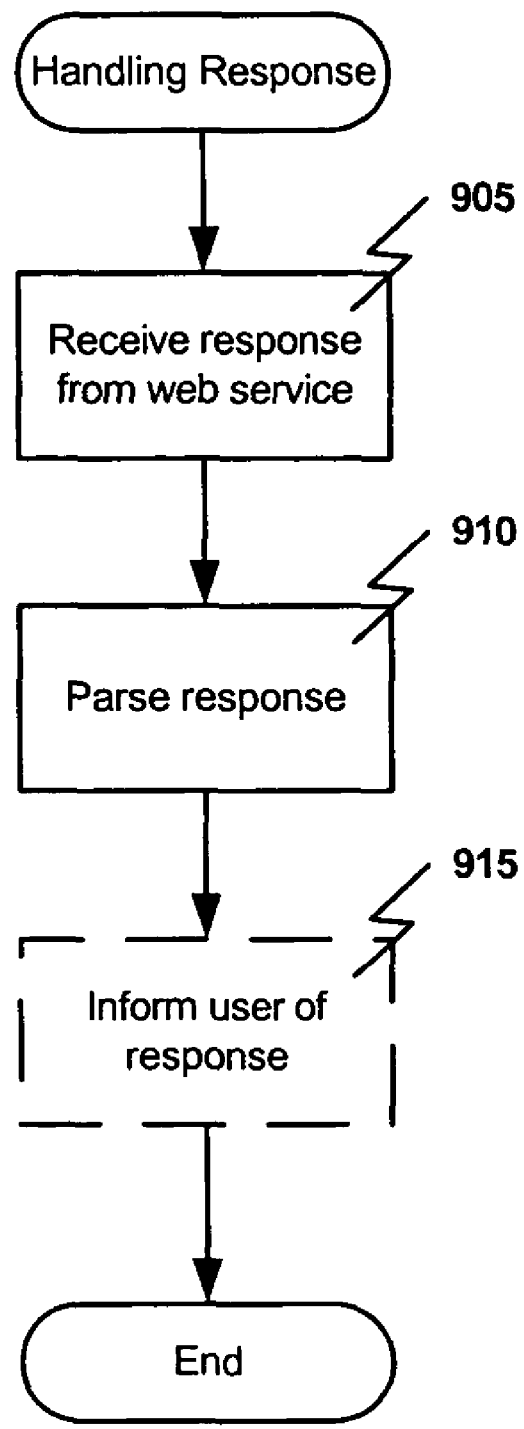
FIG. 9 is a flowchart illustrating handling a response from a web service according to an embodiment of the present invention.

FIG. 9 is a flowchart illustrating handling a response from a web service according to an embodiment of the present invention. In this example, operation begins with receive operation 905. Receive operation 905 receives the response from the web service.

Parse operation 910 then parses the response. That is, the received response is parsed, based on the delimiters of the XML file to identify and read the individual elements as described above with reference to FIG. 5.

Finally, optional notification operation 915 notifies the user of the success or failure of the message queued based on the response data. This operation is optional since, in some cases, a notification may not be desired. For example, if the message was successfully placed into the transmission queue of the SMSC, no notification may be given. In other cases, all responses may prompt notification of the user. The notification may be in the form of opening a window or other user interface element to inform the user of the success of failure of the message. The notification may include return codes, error codes, and/or error messages from the response.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of mobile device messaging comprising:
receiving, at a web service client, a request from a user to send content to a mobile device;
collecting, from an originating system of the user, information including content data to be sent to the mobile device;
generating two or more short messages encapsulating the content data, the short message formatted to be readable by a web service and the content data formatted to be readable by the mobile device;
sending the two or more short messages to the web service for delivery to the mobile device; and
receiving a response readable by the originating system that indicates a status of delivery of the two or more short messages, wherein said response has a first result element and a second result element, and further wherein each said result element has one or more child elements representing details of said result element, wherein,
the first result element further comprises:
a first child count element of the first result element, wherein the first child count element indicates a number of the two or more short messages delivered successfully;

and wherein the second result element further comprises:
a second child count element of the second result element, wherein the second child count element indicates a number of the two or more short messages unsuccessfully delivered;
a recipient element, wherein the recipient element is included when a recipient is associated with an error that caused the unsuccessful delivery of the two or more short messages;
an error cause element comprising an indication of the cause of the error that resulted in unsuccessful delivery of the short messages unsuccessfully delivered; and
a message element that contains a message describing the error;
parsing the received response into individual elements; and
notifying the web service client of the success or failure of the two or more messages based on the individual elements from the parsed received response.

2. The method of claim 1, further comprising:
receiving the two or more short messages at a web service;
determining whether a sender of the short message is authentic and authorized to send the short message based on sender information in the short message; and
if the sender of the short message is authentic and authorized to send the short message, sending the content data from the short message to the mobile device.

3. The method of claim 1, wherein collecting information to be sent to the mobile device further comprises collecting sender information, the sender information comprising a sender identification and a sender password.

4. The method of claim 1, wherein collecting information to be sent to the mobile device further comprises collecting destination information, the destination information comprising a service provider and a cellular telephone number of a destination mobile device.

5. The method of claim 1, wherein collecting information to be sent to the mobile device further comprises collecting delivery information, the delivery information comprising a time and date for the web service to send the content data to the mobile device.

6. The method of claim 1, wherein generating one of the two or more short messages further comprises:
determining whether the content data is longer than a pre-determined size for the short message;
responsive to determining the content data is longer than the pre-determined size for the short message, determining whether to split the content data into multiple portions;
responsive to determining to split the content data into multiple portions, splitting the content data into multiple portions, each portion not longer than the predetermined size for the short message; and
encapsulating each portion in a separate short message.

7. The method of claim 1, wherein generating the two or more short messages comprises generating an eXtensible Mark-up Language (XML) file including the content data contained in a Short Message Service (SMS) message.

8. The method of claim 1, wherein generating the two or more short messages comprises generating an eXtensible Mark-up Language (XML) file including the content data contained in a Multimedia Message Service (MMS) message.

9. The method of claim 1, wherein sending the two or more short messages to the web service comprises sending the two or more short messages using the Simple Object Access Protocol (SOAP).

10. A method for mobile device messaging over a web service comprising:
receiving two or more short messages from a web service client, the two or more short messages formatted to be readable by a web service and containing content data formatted to be readable by a mobile device, wherein the content data was specified by a user request to be sent from an originating system of the user to the mobile device;
determining whether a sender of the two or more short messages is authentic and authorized to send the two or more short messages;
if the sender of the two or more short messages are authentic and authorized to send the two or more short messages, sending the content data to the mobile device;
generating a response readable by the web service client and indicating a status of delivery of the two or more short messages, wherein said response has a first result element an a second result element, and further wherein each said result element has one or more child elements representing details of said result element, wherein,
the first result element further comprises:
a first child count element of the first result element, wherein the first child count element indicates a number of the two or more short messages delivered successfully;
and wherein the second result element further comprises:
a second child count element of the second result element indicates a number of the two or more short messages unsuccessfully delivered;
a recipient element, wherein the recipient element is included when a recipient is associated with an error that caused the unsuccessful delivery of the two or more short messages;
an error cause element comprising an indication of the cause of the error that resulted in unsuccessful delivery of the short messages unsuccessfully delivered; and
a message element that contains a message describing the error; and
sending the response to the web service client.

11. The method of claim 10, wherein the two or more short messages comprises an eXtensible Mark-up Language (XML) file including the content data contained in a Short Message Service (SMS) message.

12. The method of claim 10, wherein the two or more short messages comprises an eXtensible Mark-up Language (XML) file including the content data contained in a Multimedia Message Service (MMS) message.

13. A system for mobile device messaging over a web service comprising:
a processor; and
a memory coupled with and readable by the processor and containing instructions that, when executed by the processor, cause the processor to:
receive, at a web service client, a request from a user to send content to a mobile device;
collect, from an originating system of the user, information including content data to be sent to the mobile device;
generate two or more short messages encapsulating the content data, the two or more short messages formatted to be readable by a web service and the content data formatted to be readable by the mobile device;
send the two or more short messages to a web service for delivery to the mobile device;

receive a response readable by the originating system that indicates a status of delivery of the two or more short messages, wherein said response has a first result element and a second result element, and further wherein each said result element has one or more child elements representing details of said result element, wherein, the first result element further comprises:
a first child count element of the first result element, wherein the first child count element indicates a number of the two or more short messages delivered successfully;

and wherein the second result element further comprises:
second child count element of the second result element, wherein the second child count element indicates a number of the two or more short messages unsuccessfully delivered;
a recipient element, wherein the recipient element is included when a recipient is associated with an error that caused the unsuccessful delivery of the two or more short messages;
an error cause element comprising an indication of the cause of the error that resulted in unsuccessful delivery of the short messages unsuccessfully delivered; and
a message element that contains a message describing the error;

parsing the received response into individual elements; and notifying the web service client of the success or failure of the two or more messages based on the individual elements from the parsed received response.

14. The system of claim 13, wherein collecting information to be sent to the mobile device further comprises collecting sender information, the sender information comprising a sender identification and a sender password.

15. The system of claim 13, wherein collecting information to be sent to the mobile device further comprises collecting destination information, the destination information comprising a service provider and a cellular telephone number of a destination mobile device.

16. The system of claim 13, wherein collecting information to be sent to the mobile device further comprises collecting delivery information, the delivery information comprising a time and date for the web service to send the content data to the mobile device.

17. The system of claim 13, wherein generating one of the two or more short messages further comprises:
determining whether the content data is longer than a pre-determined size for the short message;
responsive to determining the content data is longer than the pre-determined size for the short message, determining whether to split the content data into multiple portions;
responsive to determining to split the content data into multiple portions, splitting the content data into multiple portions, each portion not longer than the predetermined size for the short message; and
encapsulating each portion in a separate short message.

18. The system of claim 13, wherein generating the two or more short messages comprises generating an eXtensible Mark-up Language (XML) file including the content data contained in a Short Message Service (SMS) message.

19. The system of claim 13, wherein generating the two or more short messages comprises generating an eXtensible Mark-up Language (XML) file including the content data contained in a Multimedia Message Service (MMS) message.

20. The system of claim 13, wherein sending the two or more short messages to the web service comprises sending the two or more short messages using the Simple Object Access Protocol (SOAP).

21. A system for mobile device messaging over a web service comprising:
a processor; and
a memory coupled with and readable by the processor and containing a series of instructions that, when executed by the processor, cause the processor to:
receive two or more short messages from a web service client, the two or more short messages formatted to be readable by a web service and containing content data formatted to be readable by a mobile device, wherein the content data was specified by a user request to be sent from an originating system of the user to the mobile device;
determine whether a sender of the two or more short messages are authentic and authorized to send the two or more short messages, and if the sender of the two or more short messages are authentic and authorized to send the two or more short messages, send the content data to the mobile device;
generate a response readable by the web service client that indicates a status of delivery of the two or more short messages, wherein said response has a first result element and a second result element, and further wherein each said result element has one or more child elements representing details of said result element, wherein,
the first result element further comprises:
a first child count element of the first result element, wherein the first child count element indicates a number of the two or more short messages delivered successfully;
and wherein the second result element further comprising:
a second child count element of the second result element indicates a number of the two or more short messages unsuccessfully delivered;
a recipient element, wherein the recipient element is included when a recipient is associated with an error that caused the unsuccessful delivery of the two or more short messages;
an error cause element comprising an indication of the cause of the error that resulted in unsuccessful delivery of the short messages unsuccessfully delivered; and
a message element that contains a message describing the error; and
send the response to the web service client.

22. The system of claim 21, wherein the two or more short messages comprises an eXtensible Mark-up Language (XML) file including the content data contained in a Short Message Service (SMS) message.

23. The system of claim 21, wherein the two or more short messages comprises an eXtensible Mark-up Language (XML) file including the content data contained in a Multimedia Message Service (MMS) message.

* * * * *